(12) United States Patent
Ogundare et al.

(10) Patent No.: US 11,519,807 B2
(45) Date of Patent: Dec. 6, 2022

(54) METHOD AND SYSTEM TO DETERMINE VARIATIONS IN A FLUIDIC CHANNEL

(71) Applicant: HALLIBURTON ENERGY SERVICES, INC., Houston, TX (US)

(72) Inventors: Oluwatosin Ogundare, Katy, TX (US); Claudio Olmi, Houston, TX (US); David B. Bennett, Conroe, TX (US); Terry Don Bickley, Humble, TX (US); Daniel Joshua Stark, Houston, TX (US); Jeremy Coss Nicholson, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 299 days.

(21) Appl. No.: 16/713,118

(22) Filed: Dec. 13, 2019

(65) Prior Publication Data

US 2021/0180445 A1 Jun. 17, 2021

(51) Int. Cl.
*G01M 3/00* (2006.01)
*E21B 47/117* (2012.01)
(Continued)

(52) U.S. Cl.
CPC ............ *G01M 3/005* (2013.01); *E21B 47/117* (2020.05); *G01M 3/02* (2013.01); *G01M 3/042* (2013.01)

(58) Field of Classification Search
CPC ....... F16L 2101/30; F16L 55/34; F16L 55/48; F16L 55/46
See application file for complete search history.

(56) References Cited

U.S. PATENT DOCUMENTS

| | | | |
|---|---|---|---|
| 2,698,363 A | * | 12/1954 | Rush ............... F16L 55/48 200/61.41 |
| 2,820,959 A | * | 1/1958 | Bell .................. G01M 3/005 324/67 |

(Continued)

FOREIGN PATENT DOCUMENTS

| | | | |
|---|---|---|---|
| CN | 104392592 A | * | 3/2015 |
| CN | 110045024 A | * | 7/2019 |

(Continued)

OTHER PUBLICATIONS

Giunta, Giuseppe et al., "Vibroacoustic monitoring of pigging operationsin subsea gas transportation pipelines", ASNT Fall Conference & Quality Testing Show, Oct. 24-28, 2011, Palm Spring, CA, Publisher: The American Society for Nondestructive Testing, pp. 1-7; DOI: 10.13140/RG.2.1.3414.3769.

(Continued)

*Primary Examiner* — David A. Rogers
(74) *Attorney, Agent, or Firm* — Novak Druce Carroll LLP

(57) ABSTRACT

A system is provided that includes a dart, a pressure sensor, and a controller communicatively coupled with the sensor. The dart is disposed in a fluidic channel. The dart has a main body and a flange extending from the main body and has a diameter greater than or equal to a diameter of the fluidic channel. When the dart translates within the fluidic channel and passes a location of a variation in the fluidic channel, the flange creates a pressure pulse. The pressure sensor measures the pressure pulse within the fluidic channel created by the dart. The controller determines the location of the variation based on the measured pressure pulse.

18 Claims, 7 Drawing Sheets

(51) Int. Cl.
*G01M 3/02* (2006.01)
*G01M 3/04* (2006.01)

(56) References Cited

U.S. PATENT DOCUMENTS

| | | | | |
|---|---|---|---|---|
| 3,539,915 | A * | 11/1970 | Wood | G01N 27/904 |
| | | | | 324/220 |
| 3,561,256 | A * | 2/1971 | Bustin et al. | G01M 3/246 |
| | | | | 73/40.5 R |
| 3,755,908 | A * | 9/1973 | VerNooy | G01M 3/005 |
| | | | | 33/544.3 |
| 3,810,384 | A * | 5/1974 | Evans | G01M 3/005 |
| | | | | 73/611 |
| 3,857,182 | A * | 12/1974 | Van Riemsdijk | G01C 22/02 |
| | | | | 33/777 |
| 3,882,606 | A * | 5/1975 | Kaenel | G01B 7/281 |
| | | | | 33/544 |
| 3,903,730 | A * | 9/1975 | Matthews, Jr. | G01M 3/2823 |
| | | | | 73/40.5 R |
| 4,000,655 | A * | 1/1977 | Jones | G01B 7/02 |
| | | | | 73/865.8 |
| 4,020,674 | A * | 5/1977 | Fechter | G01M 3/005 |
| | | | | 73/40.5 R |
| 4,098,126 | A * | 7/1978 | Howard | G01B 5/0002 |
| | | | | 33/544.5 |
| 4,294,869 | A * | 10/1981 | Bassompierre-Sewrin | |
| | | | | B05C 7/08 |
| | | | | 427/177 |
| 4,457,073 | A * | 7/1984 | Payne | G01B 5/207 |
| | | | | 33/544.3 |
| 4,522,063 | A * | 6/1985 | Ver Nooy | G01M 7/00 |
| | | | | 73/579 |
| 4,541,278 | A * | 9/1985 | Marsh | G01N 29/14 |
| | | | | 422/53 |
| 4,590,799 | A * | 5/1986 | Brown | F16L 55/48 |
| | | | | 73/587 |
| 4,641,529 | A * | 2/1987 | Lorenzi | G01N 29/265 |
| | | | | 73/601 |
| 4,747,317 | A * | 5/1988 | Lara | G01C 21/16 |
| | | | | 73/865.8 |
| 4,930,223 | A * | 6/1990 | Smith | G01B 5/207 |
| | | | | 33/302 |
| 4,953,412 | A * | 9/1990 | Rosenberg | G01B 5/207 |
| | | | | 73/865.8 |
| 5,088,336 | A * | 2/1992 | Rosenberg | G01B 5/207 |
| | | | | 33/544 |
| 5,186,757 | A * | 2/1993 | Abney, Sr. | F16L 55/46 |
| | | | | 134/22.11 |
| 5,295,279 | A * | 3/1994 | Cooper | B08B 9/0557 |
| | | | | 15/104.061 |
| 5,417,112 | A * | 5/1995 | Rosenberg | G01B 7/003 |
| | | | | 324/207.22 |
| 5,532,587 | A * | 7/1996 | Downs | G01N 27/82 |
| | | | | 324/220 |
| 5,549,000 | A * | 8/1996 | Brown | G01V 1/001 |
| | | | | 73/587 |
| 5,587,534 | A * | 12/1996 | McColskey | G01B 17/02 |
| | | | | 73/592 |
| 6,401,525 | B1 * | 6/2002 | Jamieson | G01M 3/005 |
| | | | | 73/1.25 |
| 6,679,129 | B2 * | 1/2004 | Savard | F16L 55/38 |
| | | | | 73/865.8 |
| 6,857,329 | B2 * | 2/2005 | Savard | F16L 55/38 |
| | | | | 73/865.8 |
| 6,895,681 | B2 * | 5/2005 | Yonemura | B08B 9/0557 |
| | | | | 33/544 |
| 7,143,659 | B2 * | 12/2006 | Stout | F17D 5/00 |
| | | | | 73/865.8 |
| 7,231,812 | B1 * | 6/2007 | Lagare | G01M 3/005 |
| | | | | 15/104.05 |
| 7,328,475 | B2 * | 2/2008 | Smith | F16L 55/28 |
| | | | | 15/104.061 |
| 8,479,345 | B2 * | 7/2013 | Ludlow | F16L 55/38 |
| | | | | 15/104.061 |
| 8,869,599 | B2 * | 10/2014 | Ben-Mansour | G01M 3/005 |
| | | | | 73/49.5 |
| 8,973,444 | B2 * | 3/2015 | Hill | G01M 3/243 |
| | | | | 73/643 |
| 9,453,821 | B2 * | 9/2016 | Minto | F17D 5/005 |
| 9,599,272 | B2 * | 3/2017 | Hartog | F16L 55/48 |
| 9,599,528 | B2 * | 3/2017 | Di Lullo | F16L 55/38 |
| 9,625,348 | B2 * | 4/2017 | Hill | G01M 3/047 |
| 9,897,243 | B2 * | 2/2018 | Giunta | F16L 55/48 |
| 9,927,060 | B2 * | 3/2018 | Moses | F16L 55/34 |
| 10,132,823 | B2 * | 11/2018 | Giunta | G01S 5/22 |
| 10,704,935 | B2 * | 7/2020 | Waters | G01F 1/28 |
| 11,015,996 | B2 * | 5/2021 | Jaaskelainen | G01M 3/005 |
| 2003/0185100 | A1 | 10/2003 | D'Angelo et al. | |
| 2006/0151044 | A1 * | 7/2006 | Gurov | F17D 5/06 |
| | | | | 138/122 |
| 2011/0139538 | A1 * | 6/2011 | Hill | G01M 3/243 |
| | | | | 181/123 |
| 2014/0331745 | A1 | 11/2014 | Schaefer et al. | |
| 2015/0059498 | A1 * | 3/2015 | Di Lullo | F16L 55/40 |
| | | | | 73/865.8 |
| 2015/0331007 | A1 | 11/2015 | Giunta et al. | |
| 2016/0199888 | A1 | 7/2016 | Jaaskelainen | |
| 2017/0234122 | A1 * | 8/2017 | Moelders | E21B 47/002 |
| | | | | 73/152.16 |
| 2017/0254165 | A1 | 9/2017 | Coon | |
| 2019/0086018 | A1 * | 3/2019 | Seibi | G01M 3/243 |

FOREIGN PATENT DOCUMENTS

| | | | | |
|---|---|---|---|---|
| GB | 2462096 A | * | 1/2010 | F16L 55/48 |
| KR | 20110053499 A | * | 5/2011 | |
| WO | 2019199344 A1 | | 10/2019 | |

OTHER PUBLICATIONS

International Search Report and Written Opinion for International application No. PCT/US2019/066164, dated Sep. 7, 2020, 11 pages.

* cited by examiner

METHOD AND SYSTEM TO DETERMINE VARIATIONS IN A FLUIDIC CHANNEL

FIELD

The present disclosure relates generally to a system and method to determine variations in a fluidic channel. In at least one example, the present disclosure relates to a system and method to determine variations in a fluidic channel utilizing a dart.

BACKGROUND

Wellbores are drilled into the earth for a variety of purposes including tapping into hydrocarbon bearing formations to extract the hydrocarbons for use as fuel, lubricants, chemical production, and other purposes. These hydrocarbons are often transmitted to processing plants via pipelines. Fluidic channels such as pipelines and wellbores need to be inspected to determine variations such as junctions, nipples, leaks, blockages by deposits, or structural erosion or damage.

Most methods for monitoring the integrity of fluidic channels are intrusive, such as using pigs, overhead drones, low flying airplanes, and the like. These methods can entail considerable investments in money and time. Additionally, these methods are intrusive and require specific dimensions and abilities to properly interact with the fluidic channels.

BRIEF DESCRIPTION OF THE DRAWINGS

Implementations of the present technology will now be described, by way of example only, with reference to the attached figures, wherein.

DETAILED DESCRIPTION

Figure 1A:
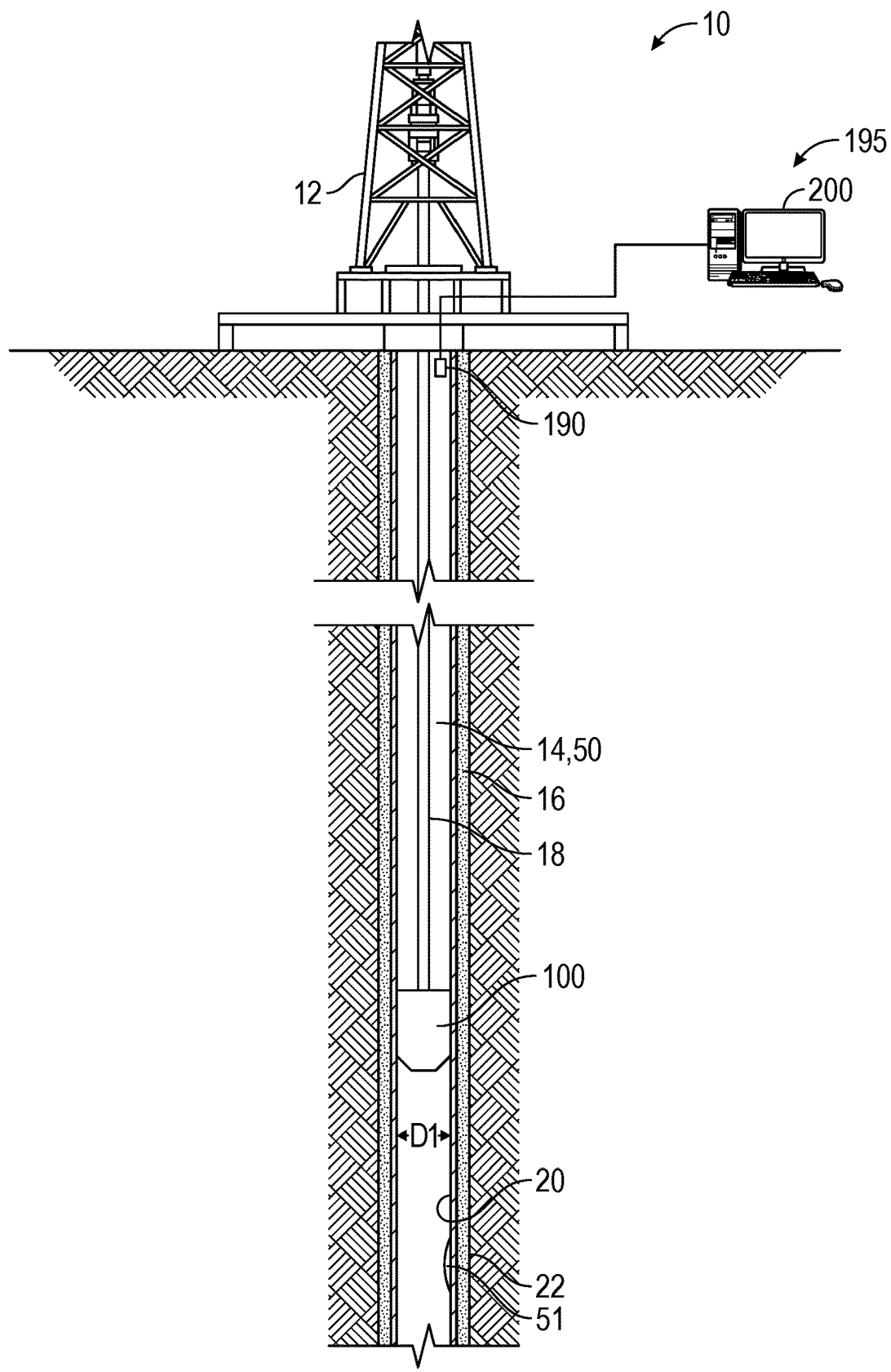
FIG. 1A is a schematic diagram of an exemplary environment for a system for determining a variation of a fluidic channel according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have been described so as not to obscure the related relevant feature being described. Also, the description is not to be considered as limiting the scope of the examples described herein. The drawings are not necessarily to scale and the proportions of certain parts may be exaggerated to better illustrate details and features of the present disclosure.

Disclosed herein are systems and methods to determine variations in a fluidic channel. Variations can include, for example, a change in the diameter of the fluidic channel, a joint, a junction, a perforation, a nipple, a leak, an indentation, and/or deposits in the fluidic channel. The system includes a dart disposed in a fluidic channel, such as a wellbore, a conduit, and/or a pipeline. The dart includes one or more flanges extending from the body of the dart. The flanges have a diameter equal to or greater than a diameter of the fluidic channel, such that when the dart translates within the fluidic channel, the flanges are in contact with the walls of the fluidic channel and, in some examples, are flexed. In some examples, the dart can include a pig. In some examples, the dart can include an oversized pig where the flanges are larger than the fluidic channel.

When the dart passes by a variation in the fluidic channel, the flanges of the dart flex due to the change in the walls of the fluidic channel. For example, the flanges may be flexed or bent against the walls when the dart translates along the fluidic channel. When there is an opening in the walls from a variation such as with a junction or a joint, the flanges may straighten and then flex again when coming back in contact with the standard shape of the walls. In some examples, the flange may be straight or in a natural state, and when the flange abuts against a variation in the walls, such as a nipple or a deposit, the flange may flex and then return to the initial configuration after passing the variation. The changes, such as flexing and/or straightening, in the flange create a pressure pulse within the fluid of the fluidic channel. The pressure pulse traverses through the fluid of the fluidic channel, and is measured by a pressure sensor. In some examples, one or more pressure sensors may be disposed behind the dart. In some examples, one or more pressure sensors may be disposed in front of the dart in the direction that the dart is traveling.

The pressure sensor(s) is communicatively coupled with a controller. The controller receives data from the pressure sensor(s) and determines the location of the variation. For example, the controller can determine the location of the variation based on the timing of the pressure pulse. In some examples, the controller can determine the type of variation, for example based on the shape and/or amplitude of the pressure pulse.

The system can be employed in an exemplary wellbore environment 10 shown, for example, in FIG. 1A. The environment 10 includes a drilling rig 12 extending over and around a fluidic channel 50, such as a wellbore 14 in FIG. 1A. The wellbore 14 is within an earth formation 22 and has a casing 20 lining the wellbore 14, the casing 20 is held into place by cement 16. A dart 100 can be disposed within the wellbore 14 and moved up and/or down the wellbore 14 via a conduit 18 to a desired location. In some examples, the dart 100 can be fluid propelled. In some examples, the dart 100 can include a motor and propeller system such that the dart 100 can translate within the wellbore 14. In some examples, the dart 100 can include a downhole tool to carry out logging and/or other operations.

The conduit 18 can be, for example, tubing-conveyed, wireline, slickline, work string, joint tubing, jointed pipe, pipeline, coiled tubing, and/or any other suitable means for conveying darts 100 into a fluidic channel 50 such as a wellbore 14. In some examples, the conduit 18 can include electrical and/or fiber optic cabling for carrying out communications. The conduit 18 can be sufficiently strong and flexible to tether the dart 100 through the wellbore 14, while also permitting communication through the conduit 18 to one or more of the processors, which can include local and/or remote processors. Moreover, power can be supplied via the conduit 18 to meet power requirements of the dart 100. For slickline or coiled tubing configurations, power can be supplied downhole with a battery or via a downhole generator.

A data acquisition system 195 includes one or more sensors 190 communicatively coupled with a controller 200 which can receive and/or process the data received from the sensors 190. While FIG. 1A illustrates one sensor 190, in other examples, more than one sensor 190 may be utilized. In at least one example, as illustrated in FIG. 1A, one or more sensors 190 can be disposed within the fluidic channel 50 at predetermined locations. The sensor 190 is positioned to measure pressure in the fluidic channel 50. Additionally, the sensor 190 may measure parameters related to the wellbore 14 and/or fluid in the wellbore 14, such as flow rate, temperature, and/or composition. In some examples, additional sensors 190 may measure additional parameters related to the wellbore 14 and/or the fluid in the wellbore 14 such as flow rate, temperature, and/or composition. In at least one example, sensor 190 can be disposed within the wellbore 14, for example coupled with or disposed in the casing 20, as illustrated in FIG. 1A.

Figure 1B:
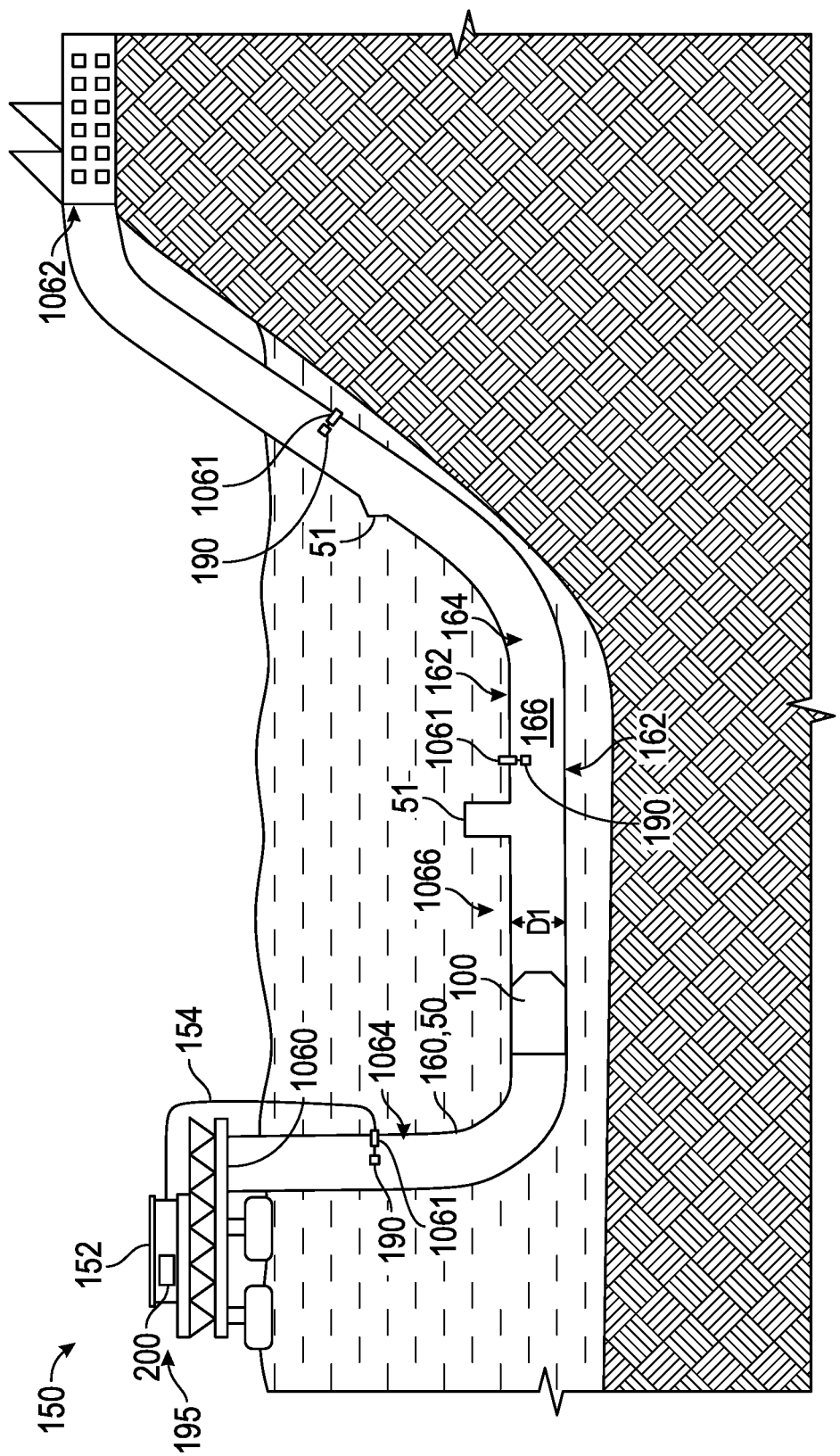
FIG. 1B is a schematic diagram of another exemplary environment for a system for determining a variation of a fluidic channel according to the present disclosure.

The system may also be employed in an exemplary system 150 shown, for example, in FIG. 1B. FIG. 1B illustrates a dart 100 deployed in a fluidic channel 50 such as a pipeline 160. In other examples, the fluidic channel 50 can be, for example, a wellbore as illustrated in FIG. 1A, a conduit, or any channel through which fluid flows. The fluidic channel 50 has a first end 1060 and a second end 1062. Each of the first end 1060 and the second end 1062 are open such that the first and second ends 1060, 1062 are accessible by an operator and fluid can flow through the open ends. In other examples, the second end 1062 of the fluidic channel 50 is closed such that fluid cannot flow through the second end 1062. In at least one example, the first and second ends 1060, 1062 can be located along any point of the fluidic channel 50. For example, the first end 1060 may be located in the middle of the fluidic channel 50. The first end 1060 is any entry point to gain access to the fluidic channel 50. As illustrated in FIG. 1B, the fluidic channel 50 has a vertical section 1064 and a horizontal section 1066. In other examples, the fluidic channel 50 can extend only in one direction or multiple directions along any axis.

The fluidic channel 50 has walls 162 which form an annulus 166 through which fluid 164 can be contained in and flow. The fluid 164 can be one fluid or more than one fluid. The fluid 164 can include, for example, water and/or oil. The fluid 164 can also substantially fill the entire fluidic channel 50. In other examples, the fluid 164 can partially fill the fluidic channel 50. The walls 162 of the fluidic channel 50 can form a cross-sectional shape such as substantially circular, ovoid, rectangular, or any other suitable shape. The walls 162 of the fluidic channel 50 can be made of any combination of plastics or metals, suitable to withstand fluid flow without corrosion and with minimal deformation.

The fluidic channel 50 can also include one or more ports 1061. The ports 1061 extend through the walls 162 of the fluidic channel 50. As such, the ports 1061 permit communication across the walls 162 from external the fluidic channel 50 to the annulus 166 within the fluidic channel 50.

The system 100 includes a data acquisition system 195, similar to the data acquisition system 195 of FIG. 1A, which receives and processes data such that the data can be used and interpreted by a user. The data acquisition system 195 can be proximate to the first end 1060 of the fluidic channel 50. The data acquisition system 195 can include one or more sensors 190 communicatively coupled with a controller 200 which can receive and/or process the data received from the sensors 190. In some examples, the sensors 190 can be coupled with the controller 200 by a transmission system 154. The transmission system 154 can be wireline, optical fiber, wirelessly such as through the cloud or Bluetooth, or any other suitable method to transmit data. In some examples, as illustrated in FIG. 1B, the controller 200 can be located in a data center 110. The data center 110 may be above ground, under water, underground, or located at any point to collect data. For example, the data center 110 may be an underwater vehicle such as a submarine. In other examples, the data center 110 may be located on a platform, as illustrated in FIG. 1B.

Referring to FIGS. 1A and 1B, along the fluidic channel 50, variations 51 in the fluidic channel 50 may form. The variations 51 can be a change of shape and/or cross-sectional area, for example, of the fluidic channel 50 any amount and in any shape and form. For example, in some areas, the variations 51 may extend into the annulus 166 of the fluidic channel 50. Variations 51 can be caused, for example, by deformation of the walls 162 of the fluidic channel 50, deposits formed along the walls 162 of the fluidic channel 50, a change in the diameter D1 of the fluidic channel 50, joints, junctions, perforations, leaks, indentations, and/or nipples. Deposits can be, for example, wax deposits, clay deposits, or any other possible deposits that can adhere to the walls 162 of the fluidic channel 50 such that the fluid flow is at least partly impeded. FIG. 1A illustrates an example of a nipple, and FIG. 1B illustrates an example of a junction and an indentation in the fluidic channel 50.

In some areas, the fluidic channel 50 may not have any variations 51. For example, the cross-sectional shape of the fluidic channel 50 can be substantially circular or any other originally desired shape as discussed above. In yet other areas, the fluidic channel 50 may have variations 51. The change in shape of the fluidic channel 50 by the variation 51 can cause the cross-sectional shape of the fluidic channel 50 to be substantially ovoid, rectangular, diamond, triangular, irregular, or any other possible shape other than the original shape of the fluidic channel 50. As illustrated in FIG. 1A, the illustrated portion of the fluidic channel 50 has one portion with variations 51. In other examples, for example as illustrated in FIG. 1B, the fluidic channel 50 can be more than one portion with variations 51. In yet other examples, the fluidic channel 50 may not have any portions with variations 51.

Figure 1C:
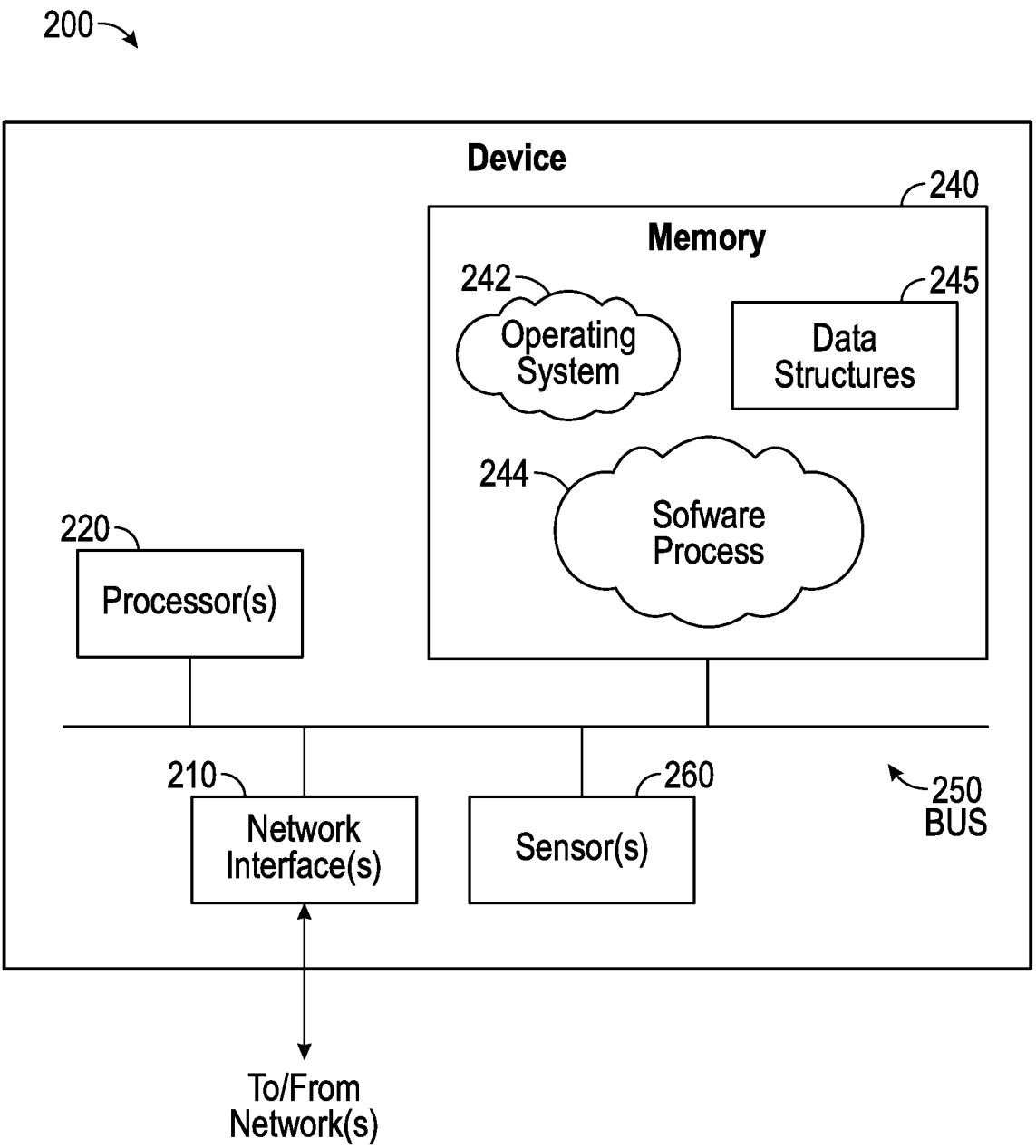
FIG. 1C is a schematic diagram of a controller which may be employed according to the present disclosure.

FIG. 1C is a block diagram of an exemplary controller 200. Controller 200 is configured to perform processing of data and communicate with the sensors 190, for example as illustrated in FIGS. 1A and 1B. In operation, controller 200 communicates with one or more of the components discussed herein and may also be configured to communication with remote devices/systems.

As shown, controller 200 includes hardware and software components such as network interfaces 210, at least one processor 220, sensors 260 and a memory 240 interconnected by a system bus 250. Network interface(s) 210 can include mechanical, electrical, and signaling circuitry for communicating data over communication links, which may include wired or wireless communication links. Network interfaces 210 are configured to transmit and/or receive data using a variety of different communication protocols, as will be understood by those skilled in the art.

Processor 220 represents a digital signal processor (e.g., a microprocessor, a microcontroller, or a fixed-logic processor, etc.) configured to execute instructions or logic to perform tasks in a wellbore environment. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260, which may include sensors 190 as disclosed herein, typically operate in conjunction with processor 220 to perform measurements, and can include special-purpose processors, detectors, transmitters, receivers, and the like. In this fashion, sensors 260 may include hardware/software for generating, transmitting, receiving, detection, logging, and/or sampling magnetic fields, seismic activity, and/or acoustic waves, or other parameters.

Memory 240 comprises a plurality of storage locations that are addressable by processor 220 for storing software programs and data structures 245 associated with the embodiments described herein. An operating system 242, portions of which may be typically resident in memory 240 and executed by processor 220, functionally organizes the device by, inter alia, invoking operations in support of software processes and/or services 244 executing on controller 200. These software processes and/or services 244 may perform processing of data and communication with controller 200, as described herein. Note that while process/service 244 is shown in centralized memory 240, some examples provide for these processes/services to be operated in a distributed computing network.

It will be apparent to those skilled in the art that other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 220 that, when executed by the processor, are operable to cause the processor to perform the functions described herein.

Additionally, the controller 200 can apply machine learning, such as a neural network or sequential logistic regression and the like, to determine relationships between the signals from the pressure pulses received by the sensors 190. For example, a deep neural network may be trained in advance to capture the complex relationship between an acoustic wave and the location of the variation. In some examples, the deep neural network may be trained to capture the complex relationship between the acoustic wave and the type of variation. This neural network can then be deployed in the determination of the variation. As such, the determination of variations 51 within a fluidic channel 50 can be more accurate.

Figure 2:
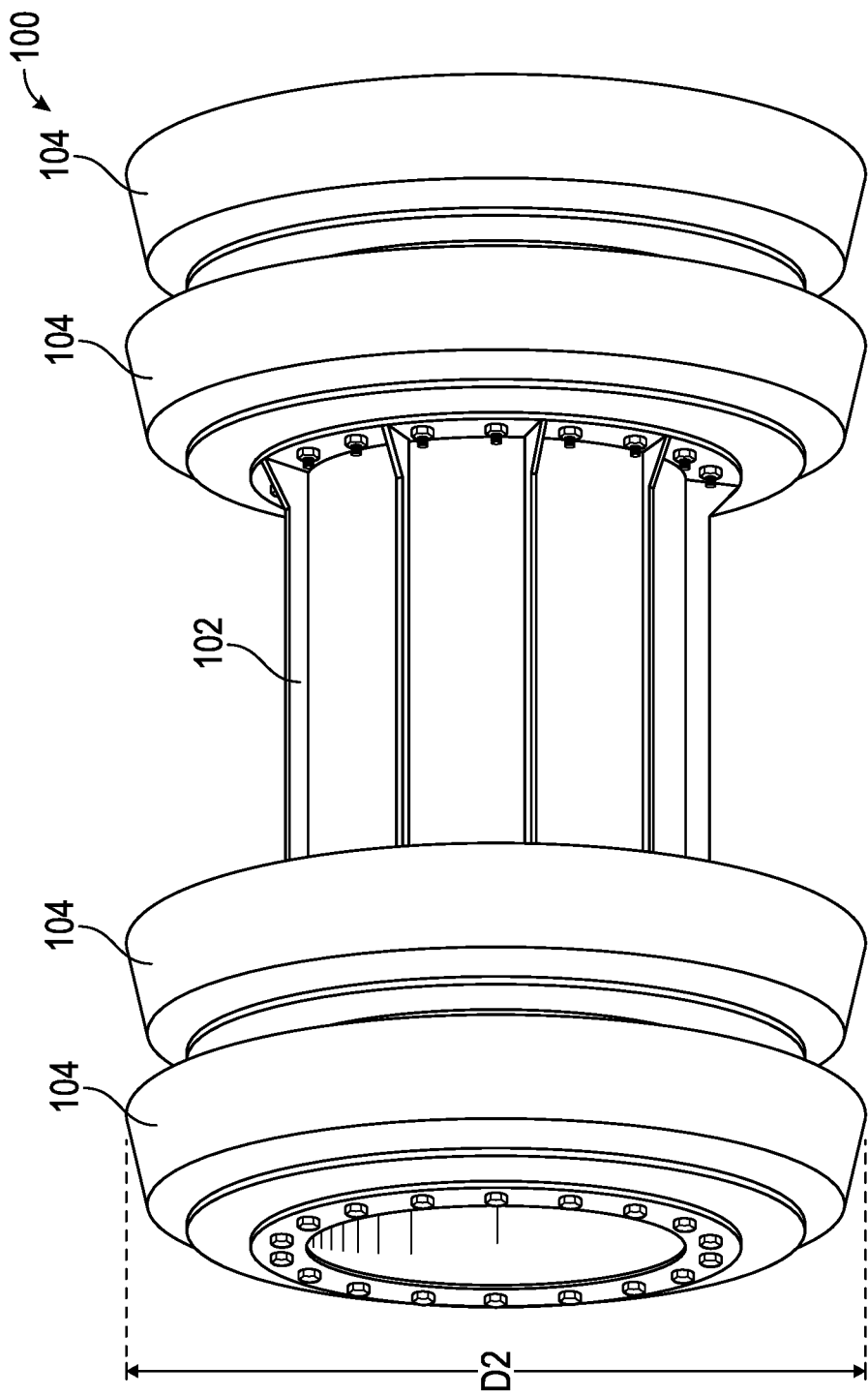
FIG. 2 is a schematic diagram of a dart used in the system of FIGS. 1A and 1B.

To obtain the measured profile and determine the variations 51 in the fluidic channel 50, a dart 100 is disposed in and passed through the fluidic channel 50. FIG. 2 illustrates an example of a dart 100 according to the present disclosure. The dart 100 can include, for example a pig or a plug which is passed through the fluidic channel 50.

The dart 100 has a main body 102 and one or more flanges 104 extending from the main body 102. As illustrated in FIG. 2, the main body 102 and the flanges 104 are both substantially cylindrical. In some examples, the main body 102 and/or the flanges 104 may be a rectangular prism, irregularly shaped, ovoid, and/or any other desired shape such that the dart 100 can pass through the fluidic channel 50.

As shown in FIGS. 1A and 1B, the dart 50 is disposed in the annulus 14, 166 of the fluidic channel 50 such that the flanges 104 of the dart 100 abut the walls 20, 162 of the fluidic channel 50. The flanges 104 have a diameter D2 greater than or equal to a diameter D1 of the fluidic channel 50. Accordingly, the flanges 104 maintain the abutment against the walls 20, 162 of the fluidic channel 50 such that the flanges 104 flex when passing any variation 51 in the fluidic channel 50. As the flanges 104 flex, the flanges 104 create a pressure pulse. The flanges 104 may flex and may have a desired amount of flex based on the elasticity of the material of the flanges 104. In some examples, the flanges 104 may flex based on the size and/or shape differential in relation to the walls 20, 162 of the fluidic channel 50 and/or the variations 51. The material selection, shape, and/or size of the flange 104 are sufficient for structural integrity while elastically deforming to an extent to result in an appreciable movement to generate a pressure pulse. As illustrated in FIG. 2, the flanges 104 have a thickness which is sloped. In other examples, the flanges 104 may have a uniform thickness. In some examples, the flanges 104 may be a thin flange 104 such as a fin. The flanges 104 can have any suitable shape so long as the flanges 104 abut the walls 20, 162 of the fluidic channel 50 and flex when passing by a variation 51 in the fluidic channel 50.

As illustrated in FIGS. 1A and 1B, one or more sensors 190 of a data acquisition system 195 receive the pressure pulse signals created by the dart 100. The sensors 190 can be disposed in front of and/or behind the dart 100 in relation to the direction of translation of the dart 100 in the fluidic channel 50. The sensor 190 can include a pressure transducer. In other examples, the sensors 190 can be any suitable sensor that measures pressure or stress of the fluid, for example a string gauge or an optical fiber transducer. The sensors 190 can be disposed within the annulus 14, 166 of the fluidic channel 50. For example, the sensors 190, as illustrated in FIG. 1B, can be mounted to and/or inserted through a port 1061 of the fluidic channel 50. The port 1061 may be pre-existing, so the fluidic channel 50 does not need to be modified or disrupted to position the sensors 190. In other examples, the sensors 190 can be disposed external to the fluidic channel 50.

As illustrated in FIGS. 1A and 1B, the signals received by the sensors 190 are passed to a controller 200 to be interpreted to map out and quantify any variations 51 in the fluidic channel 50. The controller 200 can be located at the surface, within a vehicle such as a submarine, or any other suitable location such that the data can be interpreted by an operator. The controller 200 can determine the location of the variations 51 based on the measured pressure pulse. In some examples, the controller 200 can determine the location of the variation 51 based on the time that the pressure pulse is sensed by the sensor. In at least one example, the controller 200 can determine the type of the variation 51, for example whether the variation 51 includes a change in the diameter of the fluidic channel, a joint, a junction, a perforation, a nipple, a leak, an indentation, and/or deposits in the fluidic channel. In some examples, the controller 200 can determine the type of the variation 51 based on the shape and/or amplitude of the pressure pulse. In some examples, the controller 200 can determine the type of the variation 51 as well as the location of the variation 51.

Figure 3:
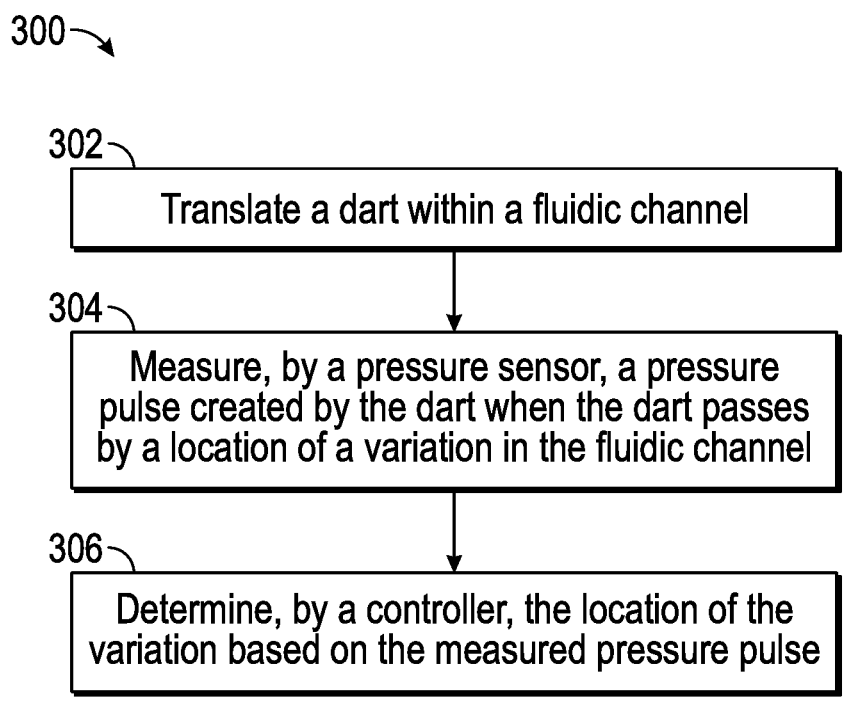
FIG. 3 is a flow chart of a method to determine variations in a fluidic channel according to the present disclosure.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1A-2 and 4-6, for example, and various elements of these figures are referenced in explaining example method 300. Each block shown in FIG. 3 represents one or more processes, methods or subroutines, carried out in the example method 300. Furthermore, the illustrated order of blocks is illustrative only and the order of the blocks can change according to the present disclosure. Additional blocks may be added or fewer blocks may be utilized, without departing from this disclosure. The example method 300 can begin at block 302.

At block 302, a dart translates within a fluidic channel. The dart includes a flange which extends from a main body. The flange has a diameter greater than or equal to a diameter of the fluidic channel such that when the dart translates within the fluidic channel and passes a location of a variation in the fluidic channel, the flange creates a pressure pulse. In at least one example, the flange creates a pressure pulse by flexing when passing by a variation.

For example, FIGS. 4A-4E illustrate a dart 100 translating within a fluidic channel 50. As illustrated in FIGS. 4A-4E, the fluidic channel 50 includes one or more variations 51. The variations 51 can include at least one of the following: a change in the diameter D1 of the fluidic channel 50, a joint, a junction, a perforation, a nipple, a leak, an indentation, deposits in the fluidic channel 50, and/or any change in the fluidic channel 50. In some examples, as illustrated in FIGS. 4A-4E, the fluidic channel 50 as illustrated in FIGS. 4A-4E include an initial variation 55, a junction 52, and a joint 54.

At block 304, a pressure sensor measures a pressure pulse created by the dart when the dart passes by a location of a variation in the fluidic channel. For example as illustrated in FIGS. 4B, 4D, and 4E, as the dart 100 passes by each of the variations 51, the dart 100 creates a pressure pulse 120 which is sensed by one or more sensors 190.

Figure 4A:
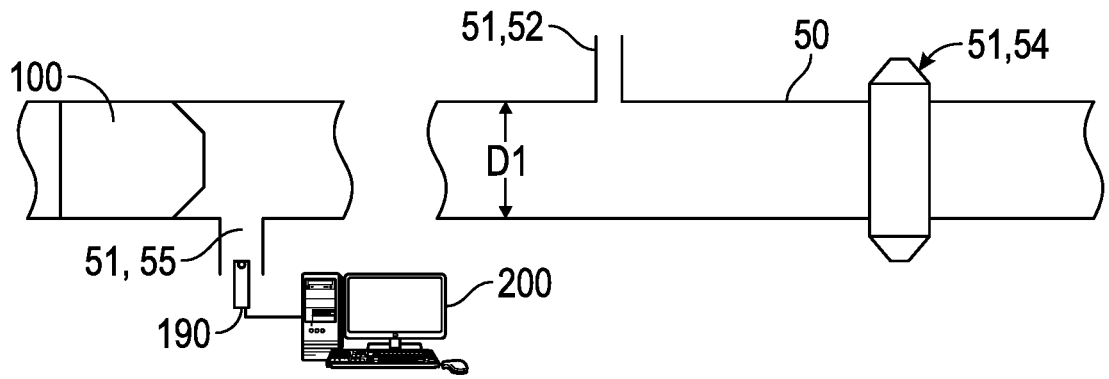
FIGS. 4A-4E are schematic diagrams of a dart translating within a fluidic channel to determine variations in the fluidic channel according to the present disclosure.
Figure 4B:
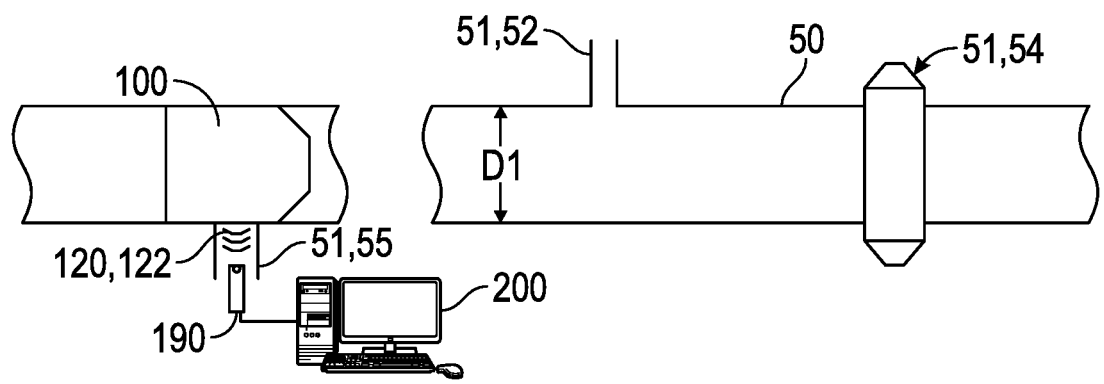
Figure 4C:
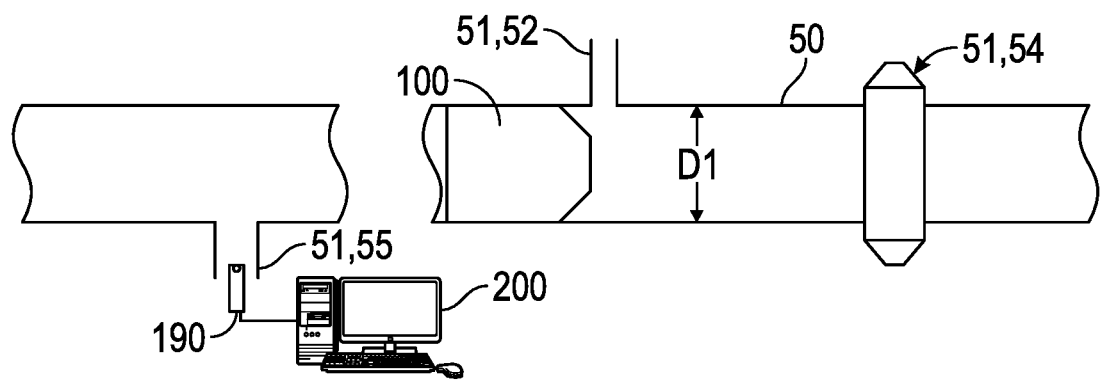

As illustrated in FIG. 4B, an initial variation 55 can be located at a trigger point such that the dart 100 creates an initial pressure pulse 122 when passing by the trigger point. As illustrated in FIGS. 4A-4E, a sensor 190 is located at the trigger point. In other examples, the sensor 190 can be located at any other location such that the sensor 190 can measure the pressure within the fluidic channel 50.

Figure 4D:
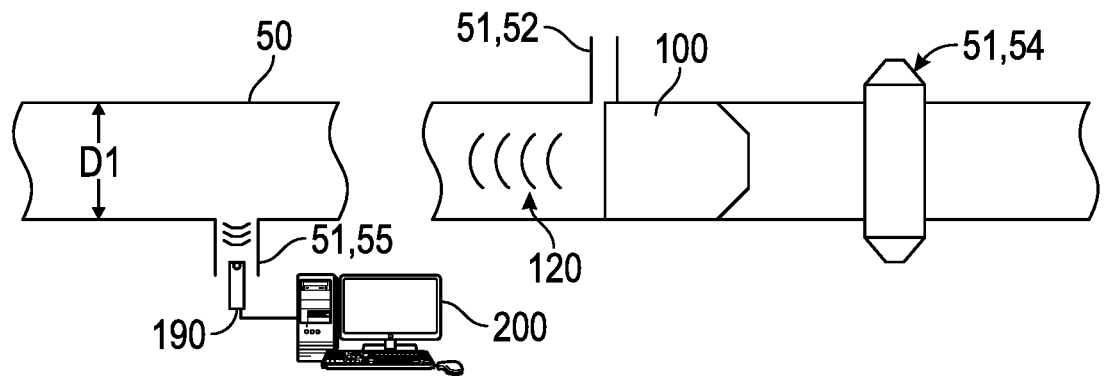
Figure 4E:
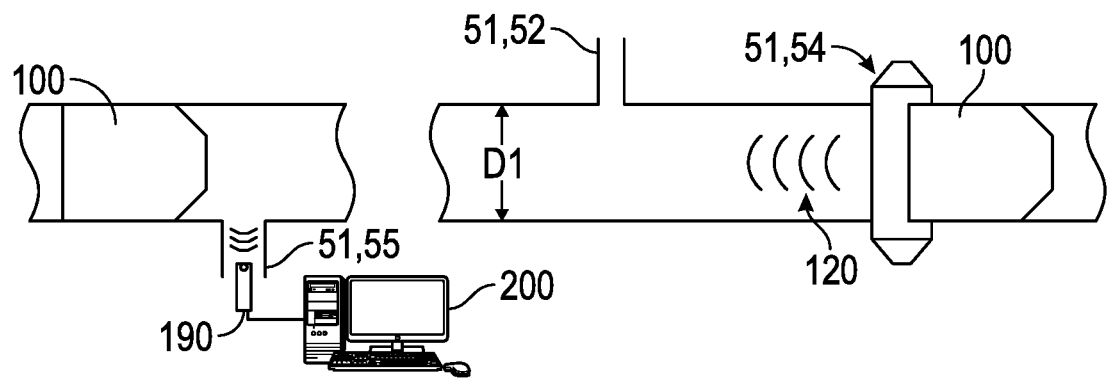

As illustrated in FIG. 4D, the variation 51 includes a junction 52. As the dart 100 passes by the opening formed by the junction 52, the flange of the dart 100 flexes which creates the pressure pulse 120 sensed by the sensor 190. As illustrated in FIG. 4E, the variation 51 includes a joint 54.

Similarly, as the dart 100 passes by the change in the walls of the fluidic channel 50 formed by the junction 52, the flange of the dart 100 flexes which creates the pressure pulse 120 sensed by the sensor 190.

Figure 5:
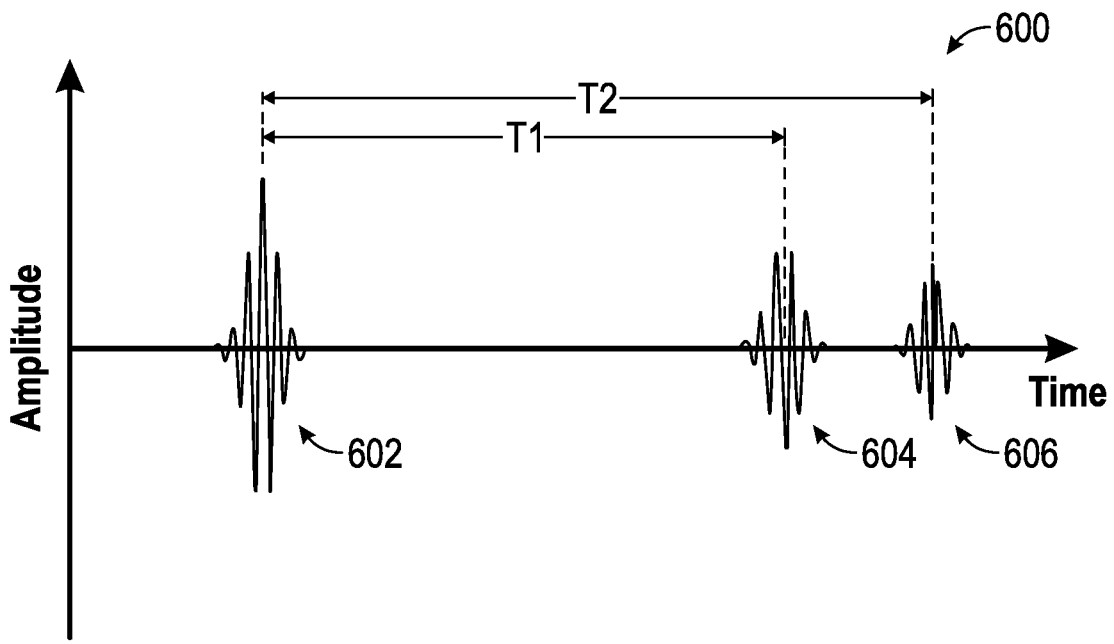
FIG. 5 is an exemplary diagram of a pressure profile recorded in the fluidic channel after induction of pressure pulses by the dart.

At block 306, a controller determines the location of the variation based on the measured pressure pulse. As illustrated in FIGS. 4A-4E, the controller 200 can be communicatively coupled with the sensor 190. FIG. 5 illustrates a diagram 600 of a pressure profile recorded in the fluidic channel after induction of pressure pulses by the dart. Pressure 602 can correspond with the initial pressure pulse created by the dart when passing by the trigger point. Pressures 604 and 606 can correspond with pressure pulses created by the dart when passing by additional variations.

In at least one example, the controller can determine the location of the variation based on the time that the pressure pulse is sensed by the sensor. For example, in FIG. 5, time T2 from the initial pressure 602 corresponding to pressure 606 is greater than time T1 from the initial pressure 602 corresponding to pressure 604. Accordingly, the controller can determine the location of the variation corresponding to pressure 606 is further than the variation corresponding to pressure 604. Additionally, in some examples, the length of time from the initial pressure 602 can be utilized to determine the distance of the variation from the trigger point. For example, the controller can calculate the rate that the pressure pulse would travel based on the properties of the fluid in the fluidic channel. In at least one example, the controller can determine the type of the variation based on the shape and/or amplitude of the pressure pulse.

Numerous examples are provided herein to enhance understanding of the present disclosure. A specific set of statements are provided as follows.

Statement 1: A system is disclosed comprising: a dart disposed in a fluidic channel, the dart having a main body and a flange extending from the main body, the flange having a diameter greater than or equal to a diameter of the fluidic channel, wherein when the dart translates within the fluidic channel and passes a location of a variation in the fluidic channel, the flange creates a pressure pulse; a pressure sensor to measure the pressure pulse within the fluidic channel created by the dart; and a controller communicatively coupled with the sensor, the controller determining the location of the variation based on the measured pressure pulse.

Statement 2: A system is disclosed according to Statement 1, wherein the fluidic channel includes at least one of the following: a pipeline, a conduit, and/or a wellbore.

Statement 3: A system is disclosed according to Statements 1 or 2, wherein the dart is configured to flex in response to passing the variation in the fluidic channel, and the controller is configured to detect a pressure pulse generated in response to the flexing of the flange.

Statement 4: A system is disclosed according to any of preceding Statements 1-3, wherein the controller determines the location of the variation based on the time that the pressure pulse is sensed by the sensor.

Statement 5: A system is disclosed according to any of preceding Statements 1-4, wherein the controller determines a type of the variation.

Statement 6: A system is disclosed according to Statement 5, wherein the type of the variation includes at least one of the following: a change in the diameter of the fluidic channel, a joint, a junction, a perforation, a nipple, a leak, an indentation, and/or deposits in the fluidic channel.

Statement 7: A system is disclosed according to Statement 5, wherein the controller determines the type of the variation based on the shape and/or amplitude of the pressure pulse.

Statement 8: A system is disclosed according to any of preceding Statements 1-7, wherein the fluidic channel has walls forming an annulus, wherein the dart is disposed in the annulus of the fluidic channel, and wherein the flange abuts the walls of the fluidic channel.

Statement 9: A system is disclosed according to any of preceding Statements 1-8, wherein the dart includes a pig.

Statement 10: A system is disclosed according to any of preceding Statements 1-9, wherein the fluidic channel includes an initial variation at a trigger point such that the dart creates an initial pressure pulse when passing by the trigger point, wherein the controller determines the location of the variation by comparing the timing of the pressure pulse for the variation with the timing of the initial pressure pulse for the trigger point.

Statement 11: A data acquisition system is disclosed comprising: a pressure sensor to measure a pressure pulse within a fluidic channel created by a dart; and a controller communicatively coupled with the sensor, the controller determining a location of a variation based on the measured pressure pulse.

Statement 12: A data acquisition system is disclosed according to Statement 11, wherein the dart includes a main body and a flange extending from the main body, the flange having a diameter greater than or equal to a diameter of the fluidic channel, wherein the dart is configured to flex in response to passing the variation in the fluidic channel, and the controller is configured to detect a pressure pulse generated in response to the flexing of the flange.

Statement 13: A data acquisition system is disclosed according to Statements 11 or 12, wherein the controller determines the location of the variation based on the time that the pressure pulse is sensed by the sensor.

Statement 14: A data acquisition system is disclosed according to any of preceding Statements 11-13, wherein the controller determines a type of the variation.

Statement 15: A data acquisition system is disclosed according to Statement 14, wherein the type of the variation includes at least one of the following: a change in the diameter of the fluidic channel, a joint, a junction, a perforation, a nipple, a leak, an indentation, and/or deposits in the fluidic channel.

Statement 16: A data acquisition system is disclosed according to Statement 14, wherein the controller determines the type of the variation based on the shape and/or amplitude of the pressure pulse.

Statement 17: A data acquisition system is disclosed according to any of preceding Statements 11-16, wherein the fluidic channel includes an initial variation at a trigger point such that the dart creates an initial pressure pulse when passing by the trigger point, wherein the controller determines the location of the variation by comparing the timing of the pressure pulse for the variation with the timing of the initial pressure pulse for the trigger point.

Statement 18: A method is disclosed comprising: translating a dart within a fluidic channel; measuring, by a pressure sensor, a pressure pulse created by the dart when the dart passes by a location of a variation in the fluidic channel; and determining, by a controller, the location of the variation based on the measured pressure pulse.

Statement 19: A method is disclosed according to Statement 18, wherein the controller determines the location of the variation based on the time that the pressure pulse is sensed by the sensor.

Statement 20: A method is disclosed according to Statements 18 or 19, further comprising: determining, by the controller, a type of the variation based on the shape and/or amplitude of the pressure pulse.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A system comprising:
   a dart disposed in a fluidic channel, the dart having a main body and a flange extending from the main body, the flange having a diameter greater than or equal to a diameter of the fluidic channel, wherein when the dart translates within the fluidic channel and passes a location of a variation in the fluidic channel, the flange creates a pressure pulse;
   a pressure sensor to measure the pressure pulse within the fluidic channel created by the dart; and
   a controller communicatively coupled with the sensor, the controller determining the location of the variation based on the measured pressure pulse;
   wherein the controller determines a type of the variation.

2. The system of claim 1, wherein the fluidic channel includes at least one of the following: a pipeline, a conduit, and/or a wellbore.

3. The system of claim 1, wherein the dart is configured to flex in response to passing the variation in the fluidic channel, and the controller is configured to detect a pressure pulse generated in response to the flexing of the flange.

4. The system of claim 1, wherein the controller determines the location of the variation based on the time that the pressure pulse is sensed by the sensor.

5. The system of claim 1, wherein the type of the variation includes at least one of the following: a change in the diameter of the fluidic channel, a joint, a junction, a perforation, a nipple, a leak, an indentation, and/or deposits in the fluidic channel.

6. The system of claim 1, wherein the controller determines the type of the variation based on the shape and/or amplitude of the pressure pulse.

7. The system of claim 1, wherein the fluidic channel has walls forming an annulus, wherein the dart is disposed in the annulus of the fluidic channel, and wherein the flange abuts the walls of the fluidic channel.

8. The system of claim 1, wherein the dart includes a pig.

9. The system of claim 1, wherein the fluidic channel includes an initial variation at a trigger point such that the dart creates an initial pressure pulse when passing by the trigger point, wherein the controller determines the location of the variation by comparing the timing of the pressure pulse for the variation with the timing of the initial pressure pulse for the trigger point.

10. A data acquisition system comprising:
    a pressure sensor to measure a pressure pulse within a fluidic channel created by a dart; and
    a controller communicatively coupled with the sensor, the controller determining a location of a variation based on the measured pressure pulse;

wherein the controller determines a type of the variation.

11. The data acquisition system of claim 10, wherein the dart includes a main body and a flange extending from the main body, the flange having a diameter greater than or equal to a diameter of the fluidic channel, wherein the dart is configured to flex in response to passing the variation in the fluidic channel, and the controller is configured to detect a pressure pulse generated in response to the flexing of the flange.

12. The data acquisition system of claim 10, wherein the controller determines the location of the variation based on the time that the pressure pulse is sensed by the sensor.

13. The data acquisition system of claim 10, wherein the type of the variation includes at least one of the following: a change in the diameter of the fluidic channel, a joint, a junction, a perforation, a nipple, a leak, an indentation, and/or deposits in the fluidic channel.

14. The data acquisition system of claim 10, wherein the controller determines the type of the variation based on the shape and/or amplitude of the pressure pulse.

15. The data acquisition system of claim 10, wherein the fluidic channel includes an initial variation at a trigger point such that the dart creates an initial pressure pulse when passing by the trigger point, wherein the controller determines the location of the variation by comparing the timing of the pressure pulse for the variation with the timing of the initial pressure pulse for the trigger point.

16. A method comprising:
translating a dart within a fluidic channel;
measuring, by a pressure sensor, a pressure pulse created by the dart when the dart passes by a location of a variation in the fluidic channel; and
determining, by a controller, the location of the variation based on the measured pressure pulse.

17. The method of claim 16, wherein the controller determines the location of the variation based on the time that the pressure pulse is sensed by the sensor.

18. The method of claim 16, further comprising:
determining, by the controller, a type of the variation based on the shape and/or amplitude of the pressure pulse.

* * * * *